United States Patent
Goodsitt et al.

(10) Patent No.: US 10,311,577 B1
(45) Date of Patent: Jun. 4, 2019

(54) TECHNIQUES TO IMPROVE EDGE DETECTION FOR IMAGES

(71) Applicant: Capital One Services, LLC, McLean, VA (US)

(72) Inventors: Jeremy Edward Goodsitt, Champaign, IL (US); Austin Grant Walters, Savoy, IL (US); Fardin Abdi Taghi Abad, Champaign, IL (US); Kenneth Taylor, Champaign, IL (US); Reza Farivar, Champaign, IL (US); Vincent Pham, Champaign, IL (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/193,502

(22) Filed: Nov. 16, 2018

(51) Int. Cl.
*G06K 9/46* (2006.01)
*G06T 7/13* (2017.01)
*G06T 7/90* (2017.01)

(52) U.S. Cl.
CPC .............. *G06T 7/13* (2017.01); *G06K 9/4642* (2013.01); *G06T 7/90* (2017.01)

(58) Field of Classification Search
CPC ............ G06T 7/13; G06T 7/90; G06K 9/4642
See application file for complete search history.

(56) References Cited

U.S. PATENT DOCUMENTS

| | | | | |
|---|---|---|---|---|
| 6,480,624 B1 * | 11/2002 | Horie | ..................... | G06T 5/002 358/1.9 |
| 6,665,439 B1 * | 12/2003 | Takahashi | ............ | G06K 9/0063 382/165 |
| 6,731,793 B1 * | 5/2004 | Usbeck | ..................... | H04N 1/58 382/164 |
| 6,801,672 B1 * | 10/2004 | Thomas | ..................... | G06T 5/10 382/167 |

(Continued)

FOREIGN PATENT DOCUMENTS

CN 101246593 B * 7/2011

OTHER PUBLICATIONS

Walters, A., "Edge Detection in Computer Vision," Metacortex Inc. [online] Feb. 17, 2015 [retrieved on Nov. 16, 2018] Retrieved from Internet URL:https://austingwalters.com/edge-detection-in-computer-vision/.

*Primary Examiner* — Brenda C Bernardi

(57) ABSTRACT

Techniques to improve edge detection in images. Some techniques include logic to process image data into patched image data in accordance with a colorspace model where the patched image data includes color data in a plurality of patches and identify an image group corresponding to the patched image data. The logic may be further configured to select, based upon the image group, a colorspace transform mechanism being operative to transform the image data into transformed image data in accordance with another colorspace model, the other colorspace model having a higher likelihood than the colorspace model at edge detection for the image group. The logic may be further configured to (Continued)

apply the colorspace transform mechanism to the image data to generate the transformed image data in accordance with the other colorspace mode and then, apply an edge detection technique to the transformed image data. Other embodiments are described and claimed.

20 Claims, 10 Drawing Sheets

(56) References Cited

U.S. PATENT DOCUMENTS

| | | | | |
|---|---|---|---|---|
| 7,474,342 | B2* | 1/2009 | Kohashi | H04N 5/142 |
| | | | | 348/234 |
| 8,285,036 | B2* | 10/2012 | Hiramatsu | G06K 9/48 |
| | | | | 345/590 |
| 9,355,457 | B1* | 5/2016 | Kim | G06T 7/90 |
| 9,418,426 | B1* | 8/2016 | Bernal | G06T 7/90 |
| 9,811,743 | B2* | 11/2017 | van Beek | G06K 9/00798 |
| 2001/0012397 | A1* | 8/2001 | Kato | G06T 9/005 |
| | | | | 382/166 |
| 2001/0016064 | A1* | 8/2001 | Tsuruoka | H04N 1/407 |
| | | | | 382/167 |
| 2017/0262725 | A1* | 9/2017 | Houri | G06K 9/3241 |

* cited by examiner

*600*

APPLY A MINI-COLORSPACE TRANSFORM FOR AT LEAST ONE PATCH OF PATCHED IMAGE DATA
602

TRANSFORM THE IMAGE DATA COMPRISING A RED CHANNEL, A GREEN CHANNEL, AND A BLUE CHANNEL INTO THE TRANSFORMED IMAGE DATA COMPRISING A LUMINANCE CHANNEL, AN ALPHA CHANNEL, AND A BETA CHANNEL
604

PERFORM TEXT RECOGNITION AND IDENTIFY SENSITIVE INFORMATION IN THE IMAGE
606

PROCESS A CORPUS OF IMAGES AND CONVERT EACH IMAGE INTO A GRID OF PATCHES OF WHICH EACH PATCH COMPRISES HISTOGRAM DATA
702

CLUSTER THE CORPUS INTO GROUPS OF IMAGES OF WHICH EACH IMAGE GROUP CORRESPONDS TO A PARTICULAR COLORSPACE TRANSFORM FOR SUBSTANTIALLY MAXIMIZING EDGE DETECTION
704

FOR EACH IMAGE GROUP, SELECT A SAMPLE SET OF IMAGES, COMPARE MEAN HISTOGRAM DATA OF THE SAMPLE SET OF IMAGES WITH MEAN HISTOGRAM DATA OF THE IMAGE TO PRODUCE A COMPARISON RESULT
706

CLUSTER THE CORPUS INTO GROUPS OF IMAGES BASED UPON THE COMPARISON RESULT
708

*FIG. 7*

TECHNIQUES TO IMPROVE EDGE DETECTION FOR IMAGES

BACKGROUND

Since time immemorial, certain materials (e.g., paint, ink, and/or the like) have been used to memorialize scenes and/or objects. Current methods of memorialization include the use of computers to store and analyze images. Computer technologies allow for digitization of photos into digital images and have introduced image processing as a technical field. Edge detection constitutes at least one aspect of image processing and has applications in a number of fields.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to improve edge detection in images. Some embodiments are particularly directed to techniques to improve edge detection in images for an enterprise application to use in securing a user from disclosing sensitive information.

In one embodiment, for example, an apparatus may comprise computer memory, a processing circuit; and logic stored in computer memory and executed on the processing circuit. The logic may be configured to cause the processing circuit to process image data into patched image data. The image data is configured in accordance with a colorspace model and the patched image data includes a plurality of patches of which each patch comprises color data. The logic may be further configured to cause the processing circuit to identify an image group corresponding to the patched image data. The logic may be further configured to cause the processing circuit to select a colorspace transform mechanism based upon the image group, the colorspace transform mechanism being operative to transform the image data into transformed image data in accordance with another colorspace model, the other colorspace model having a higher likelihood than the colorspace model at edge detection for the image group. The logic may be further configured to cause the processing circuit to apply the colorspace transform mechanism to the image data to generate the transformed image data in accordance with the other colorspace model. The logic may be further configured to cause the processing circuit to apply an edge detection technique to the transformed image data. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a second logic flow for the system of FIG. 1.

FIG. 7 illustrates an embodiment of a third logic flow for the system of FIG. 1.

DETAILED DESCRIPTION

Figure 1:
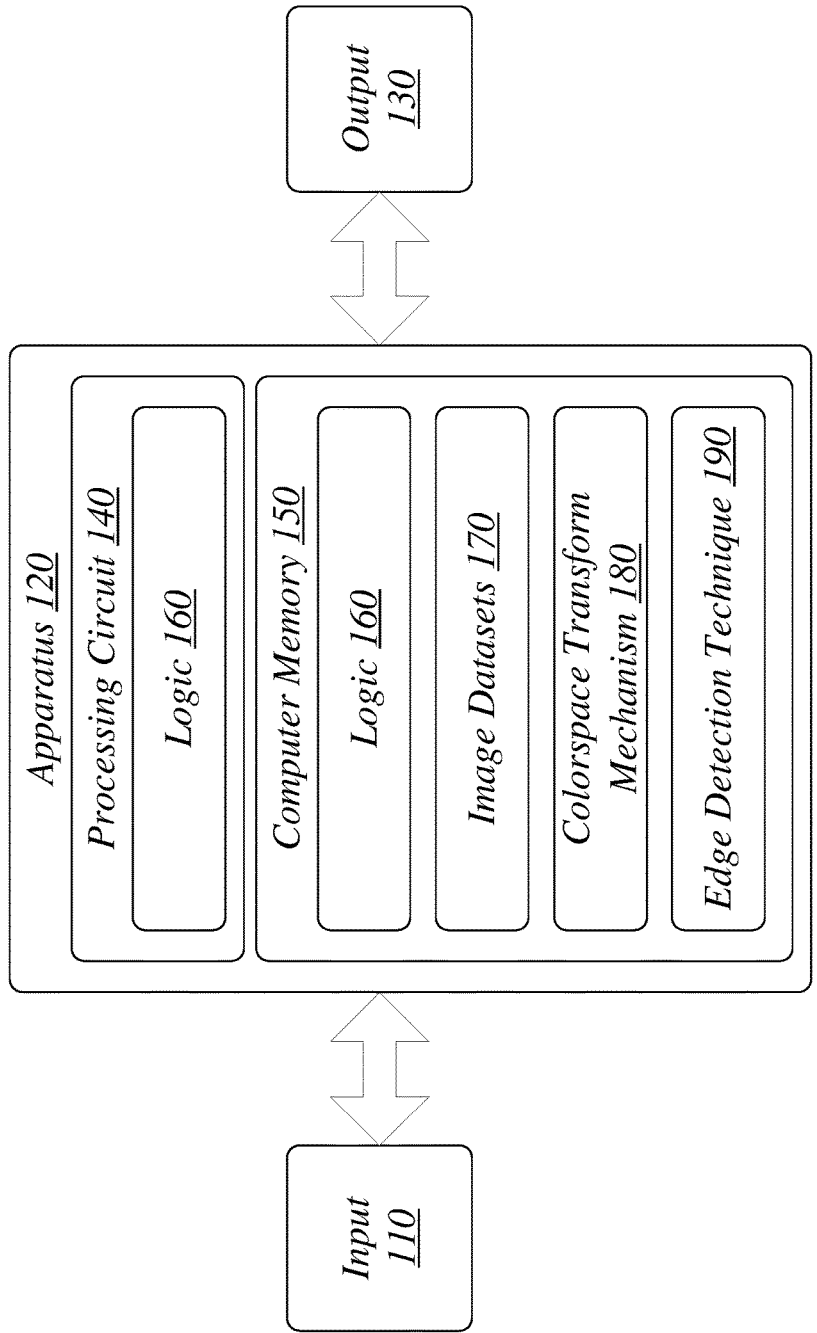
FIG. 1 illustrates an embodiment of a system to improve edge detection in images.

Various embodiments are directed to improving image processing by identifying which colorspace model is most appropriate to use for edge detection, such as for object recognition systems. It is not unusual for one colorspace model to provide better results over another colorspace in edge detection because having image data in accordance with the colorspace model has a higher likelihood of success in edge detection than the other colorspace model.

Colorspace models, in general, are configured to represent color data but most models differ in their representation of that color data. For instance, the CIELAB or LAB colorspace model represents color as three values: L for the Luminance/Lightness and Alpha (A) and Beta (B) for the green-red and blue-yellow color components, respectively. The LAB colorspace model is typically used when converting from a Red-Green-Blue (RGB) colorspace model into Cyan-Magenta-Yellow-Black (CMYK). For some images, representing its color data in the LAB colorspace model provides better edge detection results than other colorspace models including the RGB model. As a result, the embodiments can improve affordability, scalability, modularity, extendibility, or interoperability for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and in general, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. Although the system 100 shown in FIG. 1 has a limited number of elements in a certain topology, it may be appreciated that the system 100 may include more or fewer elements in alternate topologies as desired for a given implementation. The system 100 may implement some or all of the structure and/or operations for the system 100 in a single computing entity, such as entirely within a single device.

The system 100 may comprise an apparatus 120. The apparatus 120 may be generally arranged to process input 110 using various components and generate output 130 of which some output 130 is displayed on a display device. The apparatus 120 may comprise a processing circuit 140 and computer memory 150. The processing circuit 140 may be any type of logic circuit and the computer memory 150 may be a configuration of one or more memory units.

The apparatus 120 further includes logic 160 stored in the computer memory 150 and executed on the processing circuit 140. The logic 160 is operative to cause the processing circuit 140 to process image data of image datasets 170 into patched image data where the image data is being configured in accordance with a colorspace model. The colorspace model as described herein refers to any suitable colorspace model, such as Red-Green-Blue (RGB), Cyan-Magenta-Yellow-Black (CMYK), Luminance-Alpha-Beta (LAB), and/or the like. The Alpha and Beta channels of the LAB colorspace model refer to green-red and blue-yellow color components, respectively. The green-red component may represent a variance between red and green with green in the negative direction and red in the positive direction along an axis and the blue-yellow component may represent a variance between blue and yellow with blue in the negative direction and yellow in the positive direction along an axis.

The patched image data includes a plurality of patches of which each patch comprises color data (e.g., pixel data where each pixel is represented as a tuple of Red-Green-Blue (RGB) color intensities). As described herein, one colorspace model (e.g., RGB) may correspond to a higher likelihood of success in edge detection than another colorspace model. Some images provide optimal or near-optimal edge detection results when arranged in RGB while other images provide optimal or near-optimal edge detection results when arranged in LAB and vice versa.

By way of example, an image depicting a red balloon on a green field would appear much different in RGB than in LAB; therefore, with respect to edge detection, LAB would provide a higher likelihood than RGB at successfully identifying and locating edges (e.g., boundaries) of the red balloon. This is, in part, because the Alpha channel refers to the green-red component simplifying edge detection between the red balloon and the green field. Because red and green are in the same channel (as opposed to RGB where red and green are separate channels), each pixel's color must be either red or green making it is easier to determine which pixels are green and which are red. In some instances, an edge may be defined (mathematically) as each pixel location where the Alpha channel has a value of zero (0) or near zero.

The logic 160 is further operative to cause the processing circuit 140 to identify an image group corresponding to the patched image data. The image datasets 170 further includes image group model data correlating images with a colorspace model most likely to provide appropriate edge detection results. In some embodiments, the image group model data indicates which colorspace model to use in transforming a given image prior to edge detection in order to achieve near-optimal edge detection results. The logic 160 is further configured to cause the processing circuit 140 to select a colorspace transform mechanism 180 based upon the image group. The colorspace transform mechanism 180 is operative to transform the image data into transformed image data in accordance with another colorspace model, the other colorspace model having a higher likelihood than the colorspace model at edge detection for the image group. It is appreciated that the other colorspace model may be any colorspace model including those with a different number of channels than the colorspace model.

The logic 160 is further operative to cause the processing circuit 140 to apply the colorspace transform mechanism 180 to the image data to generate the transformed image data in accordance with the other colorspace model. Then, the logic 160 is operative to cause the processing circuit 140 to apply an edge detection technique 190 to the transformed image data. The edge detection technique 190 is an image processing technique that refers to any one of a number of algorithms for identifying edges or boundaries of objects within images. In general, the edge detection technique 190 provides information (e.g., pixel data) indicating positions of edges in the image data of the image datasets 170. Some implementations of the edge detection technique 190 operate by detecting discontinuities in brightness and, for those implementations, having the image data in a LAB colorspace over RGB provides more precise edge detection results. Other implementations of the edge detection technique 190 provide accurate edge detection results when the image data is modeled according to HCL (Hue-Chroma-Luminance) instead of RGB.

Figure 2:
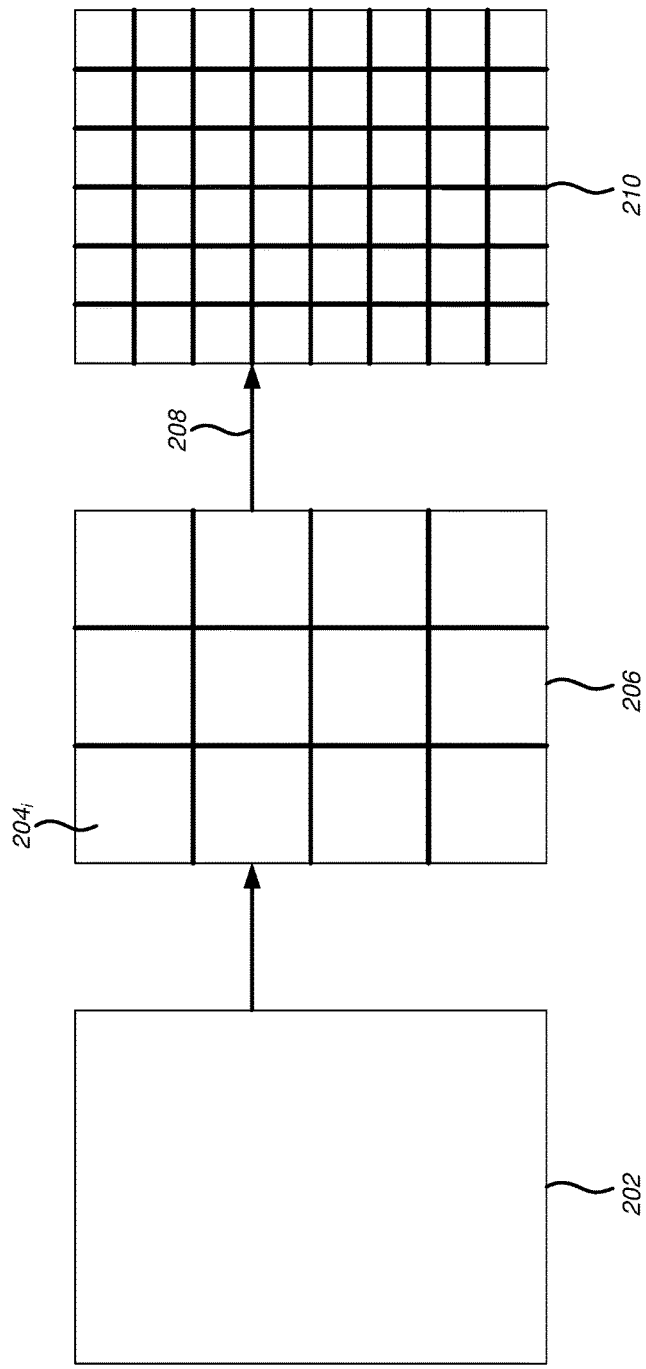
FIG. 2 illustrates an embodiment of a clustering process for the system of FIG. 1.

FIG. 2 illustrates an embodiment of a clustering process 200 for the system 100. The clustering process 200 operates on image datasets (e.g., the image datasets 170 of FIG. 1) storing color data for images.

In some embodiments of the clustering process 200, color data 202 of an image undergoes a patching operation where the image is processed into a plurality of patches 204 of patched image data 206. Each patch 204$_i$ of the patched image data 206 includes color data in accordance with a colorspace model, such as pixel data having RGB tuples. The clustering process 200 further processes the patched image data 206, via a transformation operation 208, by applying a colorspace transform mechanism on the color data of the patched image 206 to transform patched image data into transformed image data of a transformed image 210. The color data of the patched image 206 is configured in accordance with the colorspace model and new color data for the transformed image 210 is generated according to another colorspace model.

In some embodiments, the clustering process 200 performs a mini-colorspace transform for at least one patch of the patched image 206, possibly leaving one or more patches without a transformation. Via the transformation operation 208, the mini-colorspace transform modifies the color data in the at least one patch to transform patched image data into transformed image data of a transformed image 210. The clustering process 200 may perform stitching between patches to make the patched image 206 uniform as opposed to creating artificial edges.

Figure 3:
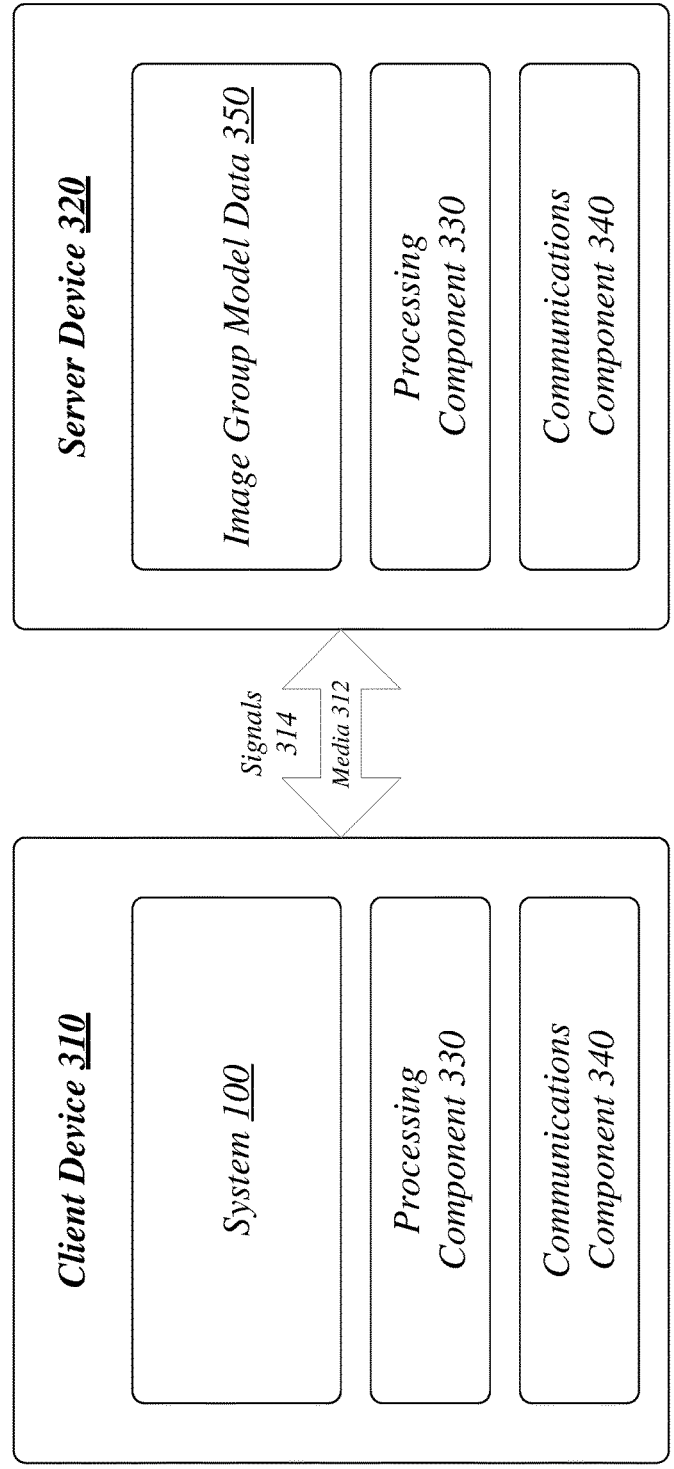
FIG. 3 illustrates an embodiment of a centralized system for the system of FIG. 1.

FIG. 3 illustrates a block diagram of a distributed system 300. The distributed system 300 may distribute portions of the structure and/or operations for the system 100 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 300 may comprise a client device 310 and a server device 320. In general, the client device 310 and/or the server device 320 may be the same or similar to the apparatus 120 as described with reference to FIG. 1. For instance, the client device 310 and the server device 320 may each comprise a processing component 330 which is the same or similar to the processing circuit 140 as described with reference to FIG. 1. In another example, the devices 310, 320 may communicate over a communications media 312 using communications signals 314 via a communications component 340.

The server device 320 may communicate with other devices over the communications media 312, using communications signals 314, via the communications component 340. The other devices may be internal or external to the device 320 as desired for a given implementation.

The client device 310 may comprise or employ one or more client programs that operate to perform various methodologies in accordance with the described embodiments. In one embodiment, for example, the client device 310 may implement the system 100 including the logic 160 of FIG. 1.

The server device 320 may comprise or employ one or more server programs that operate to perform various methodologies in accordance with the described embodiments. In one embodiment, for example, the server device 320 may implement the clustering process 200 of FIG. 2 and generate image group model data 350.

The devices 310, 320 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 310, 320 may execute instructions, processing operations, or logic for the system 100 using the processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The devices 310, 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 4:
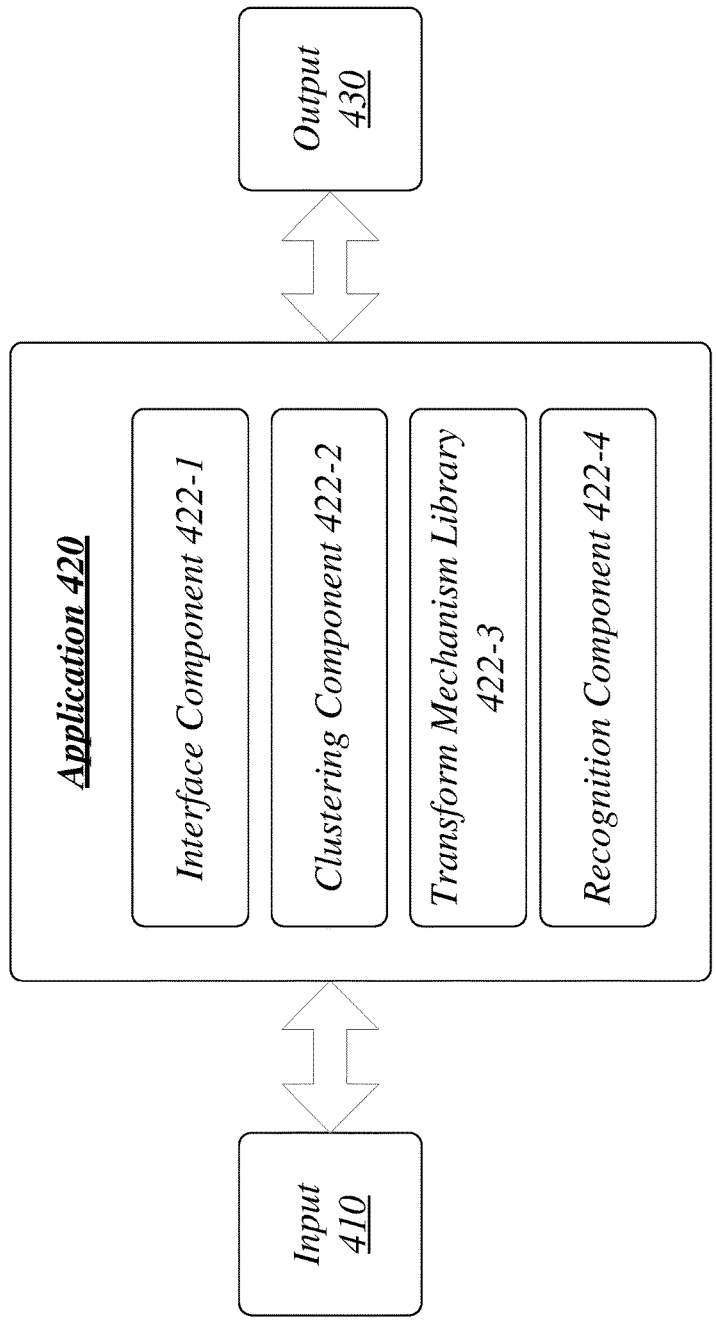
FIG. 4 illustrates an embodiment of an operating environment for the system of FIG. 1.

FIG. 4 illustrates an embodiment of an operational environment 400 for the system 100. As shown in FIG. 4, the operating environment 400 includes an application 420, such as an enterprise software application, for processing input 410 and generating output 430.

The application 420 comprises one or more components 422-$a$ where $a$ represents any integer number. In one embodiment, the application 420 may comprise an interface component 422-1, a clustering component 422-2, a transform mechanism library 422-3, and a recognition component 422-4. The interface component 422-1 may be generally arranged to manage a user interface for the application 420, for example, by generating graphical data for presentation as a Graphical User Interface (GUI). The interface component 422-1 may generate the GUI to depict various elements, such as dialog boxes, HTML forms having rich text, and/or the like.

The clustering component 422-2 may be generally arranged to organize images into image groups or clusters. Some embodiments of the clustering component 422-2 executes the clustering process 200 of FIG. 1 and generates the image group model data 350 of FIG. 3. In these embodiments, the clustering component 422-2 identifies, for each image group, a particular colorspace transform having a higher likelihood than a current colorspace transform of success in edge detection for that group. In one embodiment, the clustering component 422-2 may perform the above-mentioned clustering process for a variety of edge detection techniques, resulting in sets of image groups where each set of image groups corresponds to a particular technique. Edge detection techniques vary in how boundaries are identified in an image; some techniques detect differences in color whereas other techniques measure another attribute. Some techniques differ with respect to how color differences are even measured. It is possible for one technique to alter certain steps and create multiple techniques.

The colorspace transform library 422-3 includes a plurality of colorspace transform mechanisms and may be generally arranged to provide a colorspace transform mechanism for application on an image, transforming that image into a transformed image in accordance with a different colorspace model than the image's original colorspace model. As described herein, the colorspace model refers to a technique for modeling an image's color data, such as in RGB or in LAB. In general, the colorspace transform mechanism performs mathematical operations to map a datapoint within the image's original/current colorspace model into a corresponding datapoint in accordance with the different colorspace model. This may involve converting the datapoint's value(s)—which are in one domain—into corresponding value(s) for the corresponding datapoint. As example, the colorspace transform may convert an RGB pixel having a tuple of RGB values into a LAB pixel having a tuple of LAB values.

The recognition component 422-4 may be generally arranged to execute an edge detection technique as part of a text recognition operation on the transformed image. One example of a well-known recognition operation is Optical Character Recognition (OCR). The application 420 invokes the recognition component 422-4 to perform various tasks including securing a user from financial misappropriation. The recognition component 422-4 may perform the text recognition operation to determine whether the transformed image includes any sensitive information, such as a password or social security number (SSN), according to some embodiments. The application 420 may invoke the recognition component 422-4 prior to publishing social network content such that a potential identification of sensitive information in that content prevents said publishing. To illustrate by way of example, mobile device users upload photos onto a platform (e.g., TWITTER®) and those photos may inadvertently disclose some important piece of data if published and shared via the platform. The application 420 executes the recognition component 422-4 to identify textual data in a particular photo and then, compares that textual data to a list of important data items. If there is matching text between the particular photo and the list, the application 420 generates a message warning the mobile device user and, in addition, may block the uploading of the particular photo.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
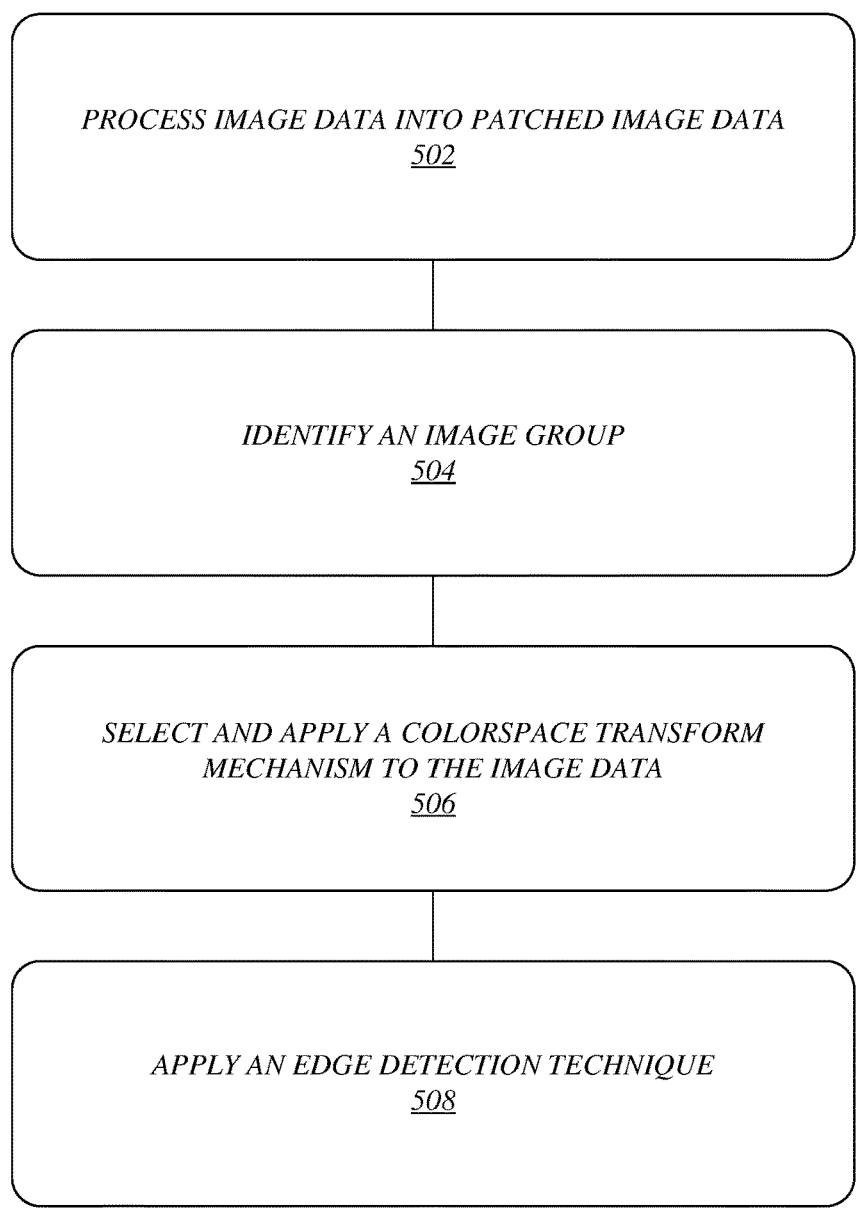
FIG. 5 illustrates an embodiment of a first logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes image data into patched image data at block 502. For example, the logic flow 500 may segment an image into a plurality of patches where each patch represents color data located within a region or patch of the image.

The logic flow 500 may identify an image group at block 504. For example, the logic flow 500 examines the image group model data 350 of FIG. 3 and determines whether the patched image data matches any of the images in a particular image group. Once the logic flow 500 identifies the particular image group as having images similar to or substantially matching the patched image data, the logic flow 500 determines that the particular image group corresponds to a colorspace transform mechanism for substantially maximizing edge detection in the image data.

The logic flow 500 may select and apply a colorspace transform mechanism to the image data at block 506. As described herein, the image data includes color data configured in accordance with a colorspace model. In some embodiments, the logic flow 500 applies the colorspace transform mechanism 180 of FIG. 1 by converting the image data into transformed image data comprising color data in accordance with another colorspace model. The color data of the transformed image data may be arranged in a representation that highlights a particular attribute, such as brightness; in this manner, differences in magnitude for that attribute can be easily assessed. The particular attribute may be desired for successful edge detection. By providing the most accurate edge detection results, the representation highlighting the particular attribute is the colorspace model having a highest likelihood for success at edge detection.

In other embodiments, the logic flow 500 may perform a colorspace transform manipulating the color data of the original image data to enable efficient edge detection on the transformed image data. As explained below, the logic flow 500 may change the colorspace model to quickly identify boundaries, such as when two colors are close in proximity. The logic flow 500 examines each datapoint in the image and for each location, the logic flow 500 identifies a color. The logic flow 500 proceeds to identify two or more colors by prevalence and configure them into one channel. Take, for instance, a first color and second color of first and second highest prevalence, respectively, where the first color becomes a minimum in the color channel and the second color becomes the maximum such that the boundary would be a transition between these colors. This boundary may be at least one pixel where the color changed from the first to the second color or vice versa. If the first color is set to zero (0) and the second color is set to two hundred and fifty-five (255), then, mathematically, this boundary would be located at pixel(s) that jumped between the minimum and maximum value; for example, there may be sharp division (i.e., thin boundary) in which at least two neighboring pixels transition immediately between 0 and 255. The logic flow 500 may identify one or more colors that are either unused or barely used (i.e., least prevalent) and establish those colors in another channel to be opposite of the above-identified prevalent colors. Then, the logic flow 500 configures each color channel to be perpendicular to one another in the colorspace model; by separating out the color channels in the colorspace, the most prevalent colors cannot create edges between each other in the colorspace model, further resulting in improved edge detection.

The logic flow 500 may apply an edge detection technique at block 508. The edge detection technique, as described herein, may execute any suitable algorithm for identifying boundaries of an object. For example, the logic flow 500 applies the edge detection technique 190 of FIG. 1 to the image data in order to determine whether any sensitive information is being leaked or disclosed inadvertently through that image data. There are a number of applicable edge detection techniques and the edge detection technique 190 may be appropriate for the other colorspace model of the transformed image data while another edge detection technique may be appropriate for the original colorspace model. The embodiments are not limited to this example.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 applies a mini-colorspace transform for at least one patch of patched image data at block 602. The mini-colorspace transform is a transform mechanism that is applied at patch-level and not image-level. For example, the patch may include textual data and, for at least that reason, the mini-colorspace transform is localized to that patch in order to recognize the textual data without processing other data in the image.

The logic flow 600 may transform the image data comprising a red channel, a green channel, and a blue channel into transformed image data comprising a luminance channel, an alpha channel, and a beta channel at block 604. The logic flow 600 may perform a text recognition operation and identify sensitive information in the image at block 606. The embodiments are not limited to this example.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may process a collection of images and convert each image into a grid of patches of which each patch comprises histogram data at block 702. For example, the logic flow 700 may partition an image into patches in patched image data, such as the plurality of patches 204 of the patched image 206 of FIG. 2 and apply the clustering process 200 of FIG. 2.

The logic flow 700 may cluster the collection into groups of images of which each image group corresponds to a particular colorspace transform for substantially maximizing edge detection at block 704. For example, the logic flow 700 may generate an initial set of image groups (e.g., at random), analyze each image group for success at edge detection under various colorspace models, reorganize the image groups according to the edge detection results, and repeat until an acceptable grouping of images is achieved. The final set of image groups may be an optimal or near-optimal grouping in terms of edge detection success.

For each image group, the logic flow 700 may select a sample set of images, compare mean histogram data of the sample set of images with mean histogram data of the image to produce a comparison result at block 706. The logic flow 700 may cluster the collection into groups of images based upon the comparison result at block 708. For example, the logic flow 700 reorganizes the collection of images into the groups of images of which each group accurately indicates the particular colorspace transform to use for substantially maximizing edge detection. This may be accomplished by applying a colorspace transform to the groups of images, performing an edge detection technique on each transformed image, and evaluating the edge detection results for accuracy. The logic flow 700 proceeds to apply additional colorspace transforms to the groups of images and evaluating their edge detection results for accuracy. After the logic flow 700 compares the edge detection results associated with different colorspace transforms and for each image group, identifies the colorspace transform corresponding to highest likelihood of edge detection. In some embodiments, the logic flow 700 identifies the colorspace transform resulting in the most accurate edge detection results. In other embodiments, the logic flow 700 identifies the colorspace transform having a lowest complexity and an acceptable level of accuracy. The embodiments are not limited to this example.

Figure 8:
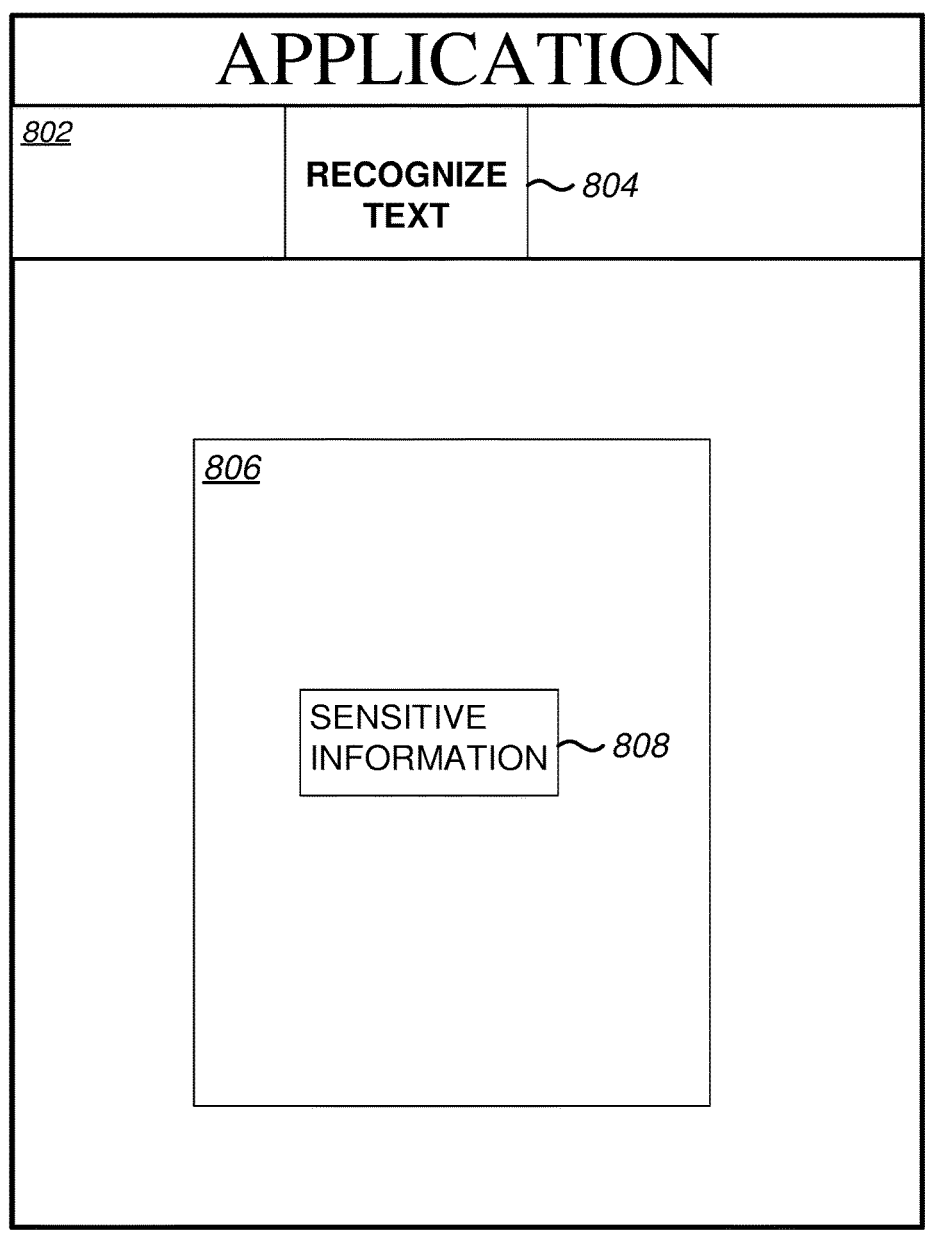
FIG. 8 illustrates an embodiment of a graphical user interface (GUI) for the system of FIG. 1.

FIG. 8 illustrates an embodiment of a graphical user interface (GUI) 800 for an application of the system 100. In some embodiments, the user interface 800 is configured for the application 420 of FIG. 4.

The GUI 800, as illustrated in FIG. 8, includes several components, such as a toolbar 802 and GUI elements. The toolbar 802 includes, as one example tool, a recognize text tool 804 that, when invoked, scans an image 806 for security issues and identifies sensitive information 808. The recognize text tool 802, in general, executes an Optical Character Recognition (OCR) process that involves a variety of image processing techniques including edge detection. In some embodiments, the recognize text tool 802 enhances the OCR process by invoking logic (e.g., the logic 160 of FIG. 1) to identify an appropriate colorspace transform mechanism to apply to the image 806 prior to performing the edge detection. As described herein, the appropriate colorspace transform mechanism provides the most accurate edge detection results because an underlying colorspace model has a higher likelihood at edge detection than any other applicable colorspace model.

Figure 9:
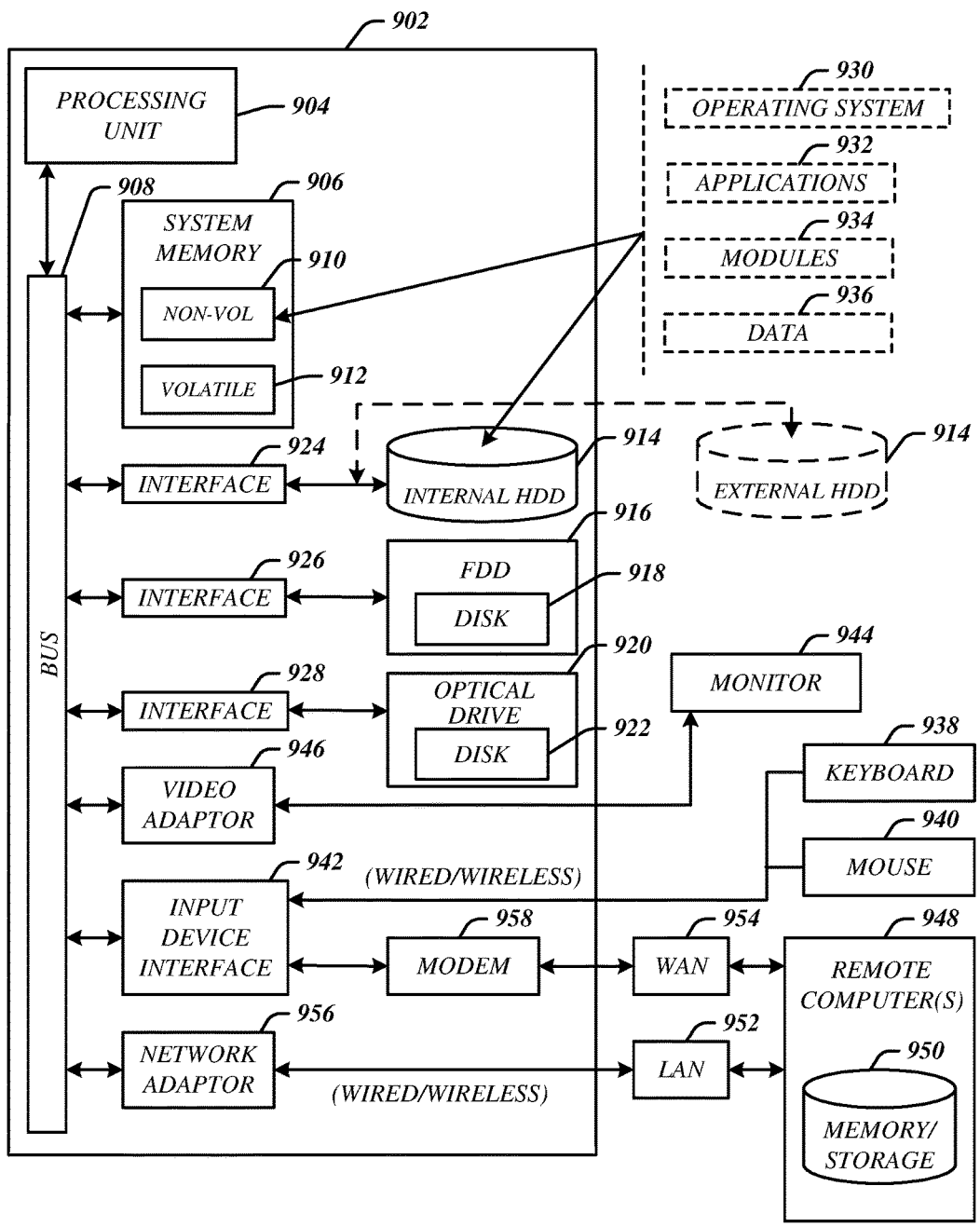
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
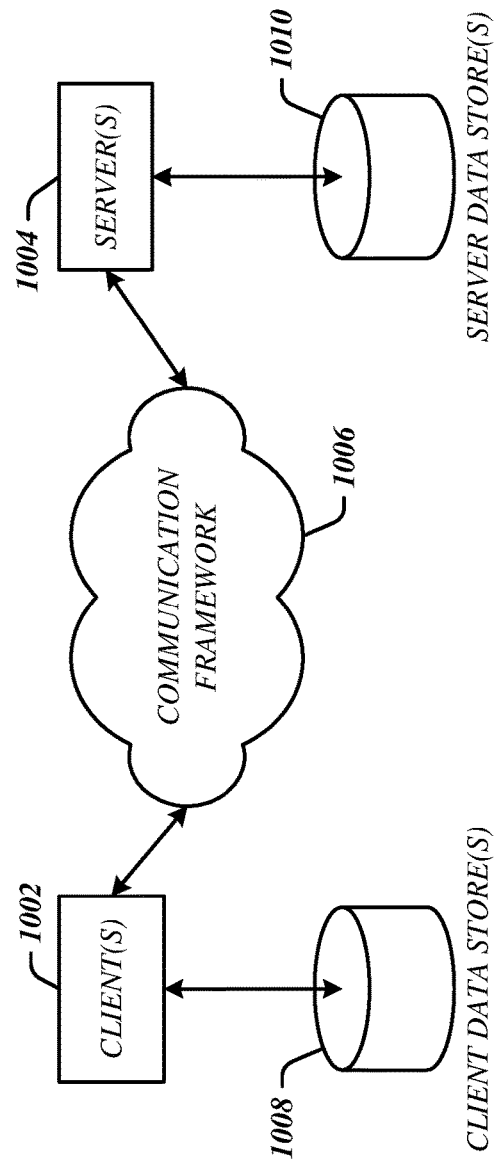
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 310. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
  a processing circuit; and
  logic stored in computer memory and executed on the processing circuit, the logic to cause the processing circuit to:
    process image data into patched image data, the image data being configured in accordance with a colorspace model, the patched image data comprising a plurality of patches of which each patch comprises color data;
    identify an image group corresponding to the patched image data;
    select a colorspace transform mechanism based upon the image group, the colorspace transform mechanism being operative to transform the image data into transformed image data in accordance with another colorspace model, the other colorspace model having a higher likelihood than the colorspace model at edge detection for the image group;
    apply the colorspace transform mechanism to the image data to generate the transformed image data in accordance with the other colorspace model; and
    apply an edge detection technique to the transformed image data.

2. The apparatus of claim 1 further comprising logic operative to cause the processing circuit to transform the image data comprising a red channel, a green channel, and a blue channel into the transformed image data comprising a luminance channel, an alpha channel, and a beta channel.

3. The apparatus of claim 1 further comprising logic operative to cause the processing circuit to process a collection of images and converting each image into a grid of patches of which each patch comprises histogram data.

4. The apparatus of claim 3 further comprising logic operative to cause the processing circuit to cluster the collection into groups of images of which each image group corresponds to a particular colorspace transform for substantially maximizing edge detection.

5. The apparatus of claim 3 further comprising logic operative to cause the processing circuit to: for each image group, select a sample set of images, compare mean histogram data of the sample set of images with a mean histogram data of the image to produce a comparison result, and cluster the collection into groups of images based upon the comparison result.

6. The apparatus of claim 1 further comprising logic operative to cause the processing circuit to recognize text in the transformed image.

7. The apparatus of claim 1 further comprising logic operative to cause the processing circuit to apply a mini-colorspace transform for at least one patch of the patched image data.

8. A computer-implemented method executed on at least one processing circuit, comprising:
  process image data into patched image data, the image data being configured in accordance with a colorspace model, the patched image data comprising a plurality of patches of which each patch comprises color data;
  identify an image group corresponding to the patched image data;
  select a colorspace transform mechanism based upon the image group, the colorspace transform mechanism being operative to transform the image data into transformed image data in accordance with another colorspace model, the other colorspace model having a higher likelihood than the colorspace model at edge detection for the image group;
  apply the colorspace transform mechanism to the image data to generate the transformed image data in accordance with the other colorspace model; and
  apply an edge detection technique to the transformed image data to determine whether the image data includes sensitive information.

9. The computer-implemented method of claim 8, comprising transforming the image data comprising a red channel, a green channel, and a blue channel into the transformed image data comprising a luminance channel, an alpha channel, and a beta channel.

10. The computer-implemented method of claim 8, comprising processing a collection of images and converting each image into a grid of patches of which each patch comprises histogram data.

11. The computer-implemented method of claim 10, comprising clustering the collection into groups of images of which each image group corresponds to a particular colorspace transform for substantially maximizing edge detection.

12. The computer-implemented method of claim 10, comprising:
  for each image group, selecting a sample set of images, comparing mean histogram data of the sample set of images with a mean histogram data of the image to produce a comparison result, and clustering the collection into groups of images based upon the comparison result.

13. The computer-implemented method of claim 8, comprising recognizing text in the transformed image data.

14. The computer-implemented method of claim 8, comprising applying a mini-colorspace transform for at least one patch of the patched image data.

15. At least one non-transitory computer-readable storage medium comprising instructions that, when executed, cause a system to:
  process image data into patched image data, the image data being configured in accordance with a colorspace model, the patched image data comprising a plurality of patches of which each patch comprises color data;

identify an image group corresponding to the patched image data;

select a colorspace transform mechanism based upon the image group, the colorspace transform mechanism being operative to transform the image data into transformed image data in accordance with another colorspace model, the other colorspace model having a higher likelihood than the colorspace model at edge detection for the image group;

apply the colorspace transform mechanism to the image data to generate the transformed image data in accordance with the other colorspace model; and apply an edge detection technique to the transformed image data to determine whether the image data includes sensitive information.

16. The non-transitory computer-readable storage medium of claim 15, comprising instructions that when executed cause the system to: process a collection of images and converting each image into a grid of patches of which each patch comprises histogram data.

17. The non-transitory computer-readable storage medium of claim 15, comprising instructions that when executed cause the system to: cluster the collection into groups of images of which each image group corresponds to a particular colorspace transform for substantially maximizing edge detection.

18. The non-transitory computer-readable storage medium of claim 15, comprising instructions that when executed cause the system to: for each image group, select a sample set of images, comparing mean histogram data of the sample set of images with a mean histogram data of the image to produce a comparison result, and clustering the collection into groups of images based upon the comparison result.

19. The non-transitory computer-readable storage medium of claim 15, comprising instructions that when executed cause the system to: recognize text in the transformed image.

20. The non-transitory computer-readable storage medium of claim 15, comprising instructions that when executed cause the system to: apply a mini-colorspace transform for at least one patch of the patched image data.

* * * * *